(12) United States Patent
Todd et al.

(10) Patent No.: US 6,789,445 B1
(45) Date of Patent: Sep. 14, 2004

(54) COMBINATION WHEEL RETAINER AND AXLE SHAFT COVER

(75) Inventors: Michael Todd, Sullivan, IL (US); Lonnie E. Holder, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 10/336,925

(22) Filed: Jan. 6, 2003

(51) Int. Cl.[7] .............................................. F16H 57/02
(52) U.S. Cl. ....................................... 74/607; 301/124.1
(58) Field of Search ............................ 74/607; 24/563; 475/74, 83; 301/111.01, 111.03, 111.04, 111.07, 113, 124.1, 111.05, 111.06; 180/307; 411/521, 517, 522, 903, 914, 352, 353; 403/315, 316, 317, 319, 350, 351

(56) References Cited

U.S. PATENT DOCUMENTS

| | | | |
|---|---|---|---|
| 1,262,370 A | * | 4/1918 | Mead .......................... 403/230 |
| 2,237,465 A | * | 4/1941 | Zimmermann ................ 403/18 |
| 4,352,586 A | * | 10/1982 | Hayden ........................ 403/163 |
| 4,822,109 A | | 4/1989 | Feria |
| 5,201,692 A | | 4/1993 | Johnson et al. |
| 5,314,387 A | | 5/1994 | Hauser et al. |
| 5,449,258 A | * | 9/1995 | Moote et al. ................. 411/521 |
| 5,520,490 A | * | 5/1996 | Perach et al. ................. 411/353 |
| 6,122,996 A | * | 9/2000 | Hauser et al. ................. 74/607 |
| 6,322,474 B1 | | 11/2001 | Hauser |
| 6,599,071 B1 | * | 7/2003 | McCauley et al. ........... 411/378 |

* cited by examiner

*Primary Examiner*—Frantz F. Jules
(74) *Attorney, Agent, or Firm*—Neal, Gerber & Eisenberg, LLP

(57) ABSTRACT

A combination wheel retainer and axle shaft cover. The combination wheel retainer and axle shaft cover includes a retaining ring portion sized and arranged to mate with an axle shaft, a cover portion sized and arranged to generally overlay an end of the axle shaft, and a joining portion for connecting the retaining ring portion to the cover portion.

39 Claims, 10 Drawing Sheets

COMBINATION WHEEL RETAINER AND AXLE SHAFT COVER

BACKGROUND OF THE INVENTION

This invention relates generally to vehicles and, more particularly, to a combination wheel retainer and axle shaft cover for use in connection with a vehicle.

Vehicles, such as vehicles driven by hydrostatic transmissions ("HSTs"), including integrated hydrostatic transmissions, are well known in the art. By way of example, and as more fully described in, among others, U.S. Pat. No. 5,314,387, which is incorporated herein by reference in its entirety, an HST includes a center section or the like on which is mounted a hydraulic pump and a hydraulic motor. The hydraulic pump and the hydraulic motor each carry a plurality of reciprocating pistons that are in fluid communication through porting formed in the center section. As the hydraulic pump rotates, the pump pistons move axially as they bear against an adjustable swash plate where the angular orientation of the swash plate affects the degree of axial movement of the pump pistons. The movement of the pump pistons forces a hydraulic fluid through the porting to the motor pistons which causes the motor pistons to be forced against a thrust bearing to thereby rotate the hydraulic motor. As the hydraulic motor rotates, hydraulic fluid is returned to the hydraulic pump through the porting. In this manner, the rotation of the hydraulic pump is translated to the hydraulic motor to drive one or more axle shafts of a riding lawn mower, small tractor, snow thrower, utility vehicle, or the like. As will be appreciated, a wheel is mounted to an end of the axle shaft.

SUMMARY OF THE INVENTION

For use in retaining a wheel on the end of the axle shaft and to provide a covering to the end of the axle shaft, a combination wheel retainer and axle shaft cover is described hereinafter. Generally, the combination wheel retainer and axle shaft cover includes a retaining ring having a cover portion that covers the end of the axle shaft. As will be appreciated, an axle shaft is typically constructed using steel, which will corrode and appear visually unappealing after a period of operation in expected environments. The combination wheel retainer and axle shaft cover serves to provide a more aesthetically pleasing appearance to the axle shaft. Furthermore, the combination wheel retainer and axle shaft cover may be plated in a manner that is more cost effective than applying a corrosion-resistant treatment to the axle shaft itself.

A better understanding of the objects, advantages, features, properties and relationships of the subject combination wheel retainer and axle shaft cover will be obtained from the following detailed description and accompanying drawings which set forth illustrative embodiments that are indicative of the various ways in which the principles of the combination wheel retainer and axle shaft cover may be employed.

BRIEF DESCRIPTION OF THE DRAWINGS

For a better understanding of the described combination wheel retainer and axle shaft cover reference may be had to preferred embodiments shown in the following drawings in which.

DETAILED DESCRIPTION

Figure 1:
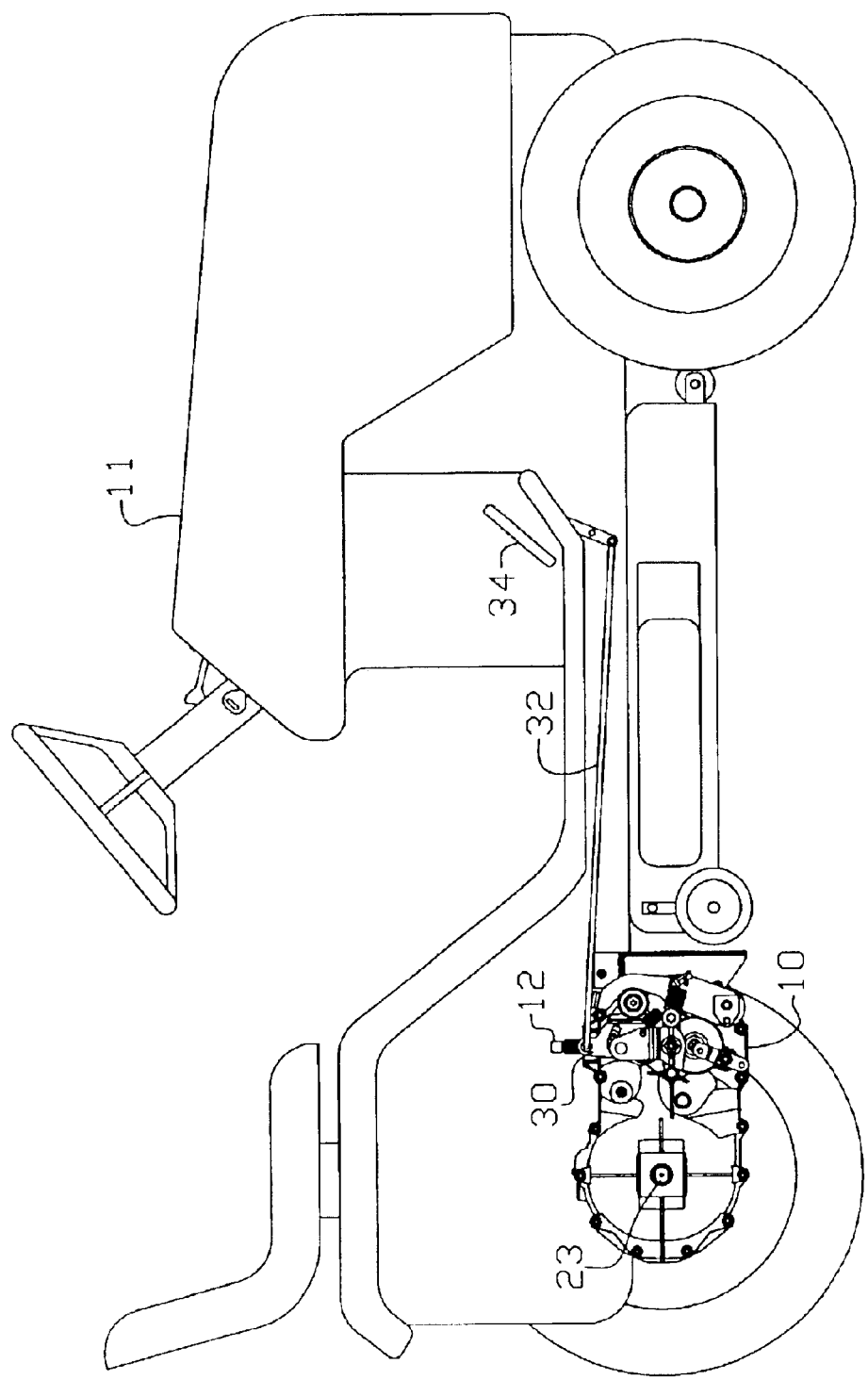
FIG. 1 illustrates an exemplary vehicle having an axle shaft with which the combination wheel retainer and axle shaft cover is usable.

Turning now to the figures, wherein like reference numerals refer to like elements, there is illustrated in FIG. 1 an exemplary vehicle 11 having axle shafts 23 with which the various wheel retainer and axle shaft covers 40 described hereinafter may be utilized. While the vehicle 11 is illustrated as being a tractor by way of example only, it will be appreciated that the subject wheel retainer and axle shaft covers 40 may be employed with any type of vehicle having one or more axle shafts 23 such as, by way of example only, a snow thrower, a utility vehicle, etc. For driving the axle shaft 23 an axle driving device is provided. By way of example only, there is illustrated in FIG. 1 an axle driving apparatus in the form of an integrated hydrostatic transmission ("IHT") 10. It is to be appreciated, however, that the illustrated and described IHT 10 is not intended to be limiting and that other axle driving apparatus may be used for driving the axle shaft 23. An exemplary IHT 10 for driving a pair of axle shafts 23 is illustrated more particularly in FIG. 2.

Figure 2:
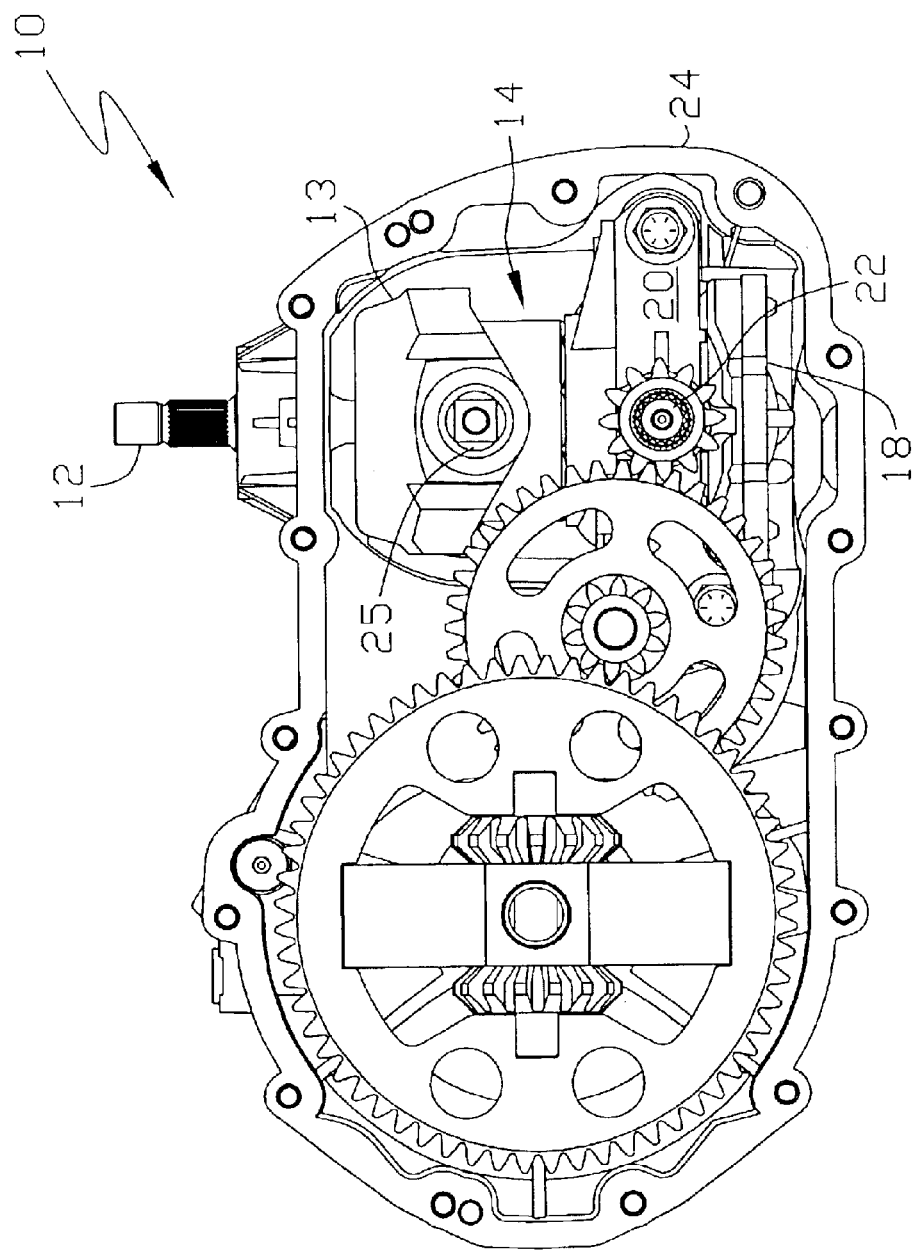
FIG. 2 illustrates an internal view of an exemplary embodiment of a hydrostatic transmission used to drive the axle shaft of the exemplary vehicle illustrated in FIG. 1.

With reference to FIG. 2, the exemplary IHT 10 generally operates on the principle of an input shaft 12 rotatably driving a hydraulic pump 14 which, through the action of its pump pistons, pushes hydraulic fluid to a hydraulic motor (not shown) through porting formed in a center section 20 to cause the rotation of the hydraulic motor. The rotation of the hydraulic motor causes the rotation of a motor shaft 22, which rotation is eventually transferred through a gearing system or the like to drive one axle shaft (in the case of a zero-turn hydrostatic transaxle) or a pair of axle shafts 23 (as illustrated in FIG. 1). A motive force from, for example, an engine may be supplied directly to the input shaft 12 or indirectly by means of a pulley to drive the hydraulic pump 14. For a more detailed description of the principles of operation of such a hydrostatic transmission, the reader is referred to U.S. Pat. Nos. 5,201,692, 6,322,474 and 6,122,996 which are incorporated herein by reference in their entirety.

To support the components of the IHT 10, the IHT 10 is provided with a housing 24 that would be mounted to the frame of the vehicle 11. In the illustrated example, the housing 24 comprises a first side housing section and a second side housing section that are joined along a substantially vertical junction surface. Extending from the top of the housing 24 is the input shaft 12. Meanwhile, the axle shafts 23 in the illustrated example would extend from both the first side housing section and the second side housing section. Thus, in the illustrated, exemplary IHT 10, the axis of the axle shafts would be generally perpendicular to the substantially vertical junction surface. Similarly, in the illustrated embodiment, since the center section 20 is generally "L-shaped," the plane of the pump running surface of the center section 20 is generally perpendicular to the substantially vertical junction surface while the plane of the motor running surface of the center section 20 is generally parallel to the substantially vertical junction surface. The axis of the motor shaft 22 would be generally parallel to the axis of the axle shafts and perpendicular to the axis of the input shaft 12. It is to be understood, however, that this arrangement is merely illustrative and that the housing and/or IHT operating components can be otherwise arranged.

For placing the hydraulic pump 14 in fluid communication with the hydraulic motor, the center section 20 includes hydraulic porting. The hydraulic porting is in further fluid communication with a source of makeup fluid, such as a fluid sump or a charge gallery. Generally, the hydraulic porting comprises a high pressure side through which fluid moves from the hydraulic pump 14 to the hydraulic motor and a low pressure side through which fluid returns from the hydraulic motor to the hydraulic pump 14. A filter assembly 18 may be positioned adjacent the center section 20, intermediate the sump and the hydraulic porting, to minimize the introduction of impurities, such as metal shavings, into the hydraulic circuit when makeup fluid is drawn into the hydraulic circuit.

To adjust the amount of oil that is forced from the hydraulic pump 14 to the hydraulic motor via the high pressure side hydraulic porting, the IHT 10 includes a moveable swash plate 13 against which the pump pistons travel. The direction of rotation of the hydraulic pump 14 is fixed by the rotation of the input shaft 12 and, as such, the hydraulic pump 14 is nearly always rotated in one direction. As will be understood by those of ordinary skill in the art, the swash plate 13 may be moved to a variety of positions to vary the stroke of the pump pistons and the direction of rotation of the hydraulic motor. Generally, as the angular orientation of the swash plate 13 is varied in one direction from the neutral position the axial displacement or stroke of the pump pistons is varied, which then drives the hydraulic motor in a direction determined by the hydraulic porting at a speed that is related to the volume of the fluid displaced by the pump pistons taking into consideration the efficiency of the system. In the neutral position, the swash plate 13 does not function to axially displace the pump pistons.

Rotation of the hydraulic motor results from the motor pistons moving against a thrust bearing under the influence of the hydraulic fluid. As the angular orientation of the swash plate 13 is decreased to pass through the neutral position, the direction of rotation of the hydraulic motor is reversed and the speed of the hydraulic motor is again influenced by the volume of fluid displaced by the pump pistons. Since the speed of rotation of the hydraulic motor is dependent upon the amount of hydraulic fluid pumped thereinto by the hydraulic pump 14 and the direction of rotation of the hydraulic motor is dependent upon the angular orientation of the swash plate 13, the angular orientation of the swash plate 13 is seen to control the speed and direction of rotation of the hydraulic motor and, as will be apparent, the speed and direction of rotation of the axle shaft(s) 23.

For moving the swash plate 13, the swash plate 13 has a trunnion arm 25 that is rotatably supported in the housing 24 of the IHT 10. Rotation of a trunnion arm 25 changes the angular orientation of the swash plate 13 with respect to the pump pistons. To rotate the trunnion arm 25 and, accordingly, move the swash plate 13, a control arm 30 is coupled to the trunnion arm 25. As illustrated in FIG. 1, the control arm 30 may be connected, via a driving link 32 or the like, to a lever, pedal, etc. (collectively referred to as a pedal 34) provided on a vehicle 11 whereby movement of the pedal 34 is translated to the control arm 30 to cause the rotation of the trunnion arm 25 and movement of the swash plate 13.

Figure 3:
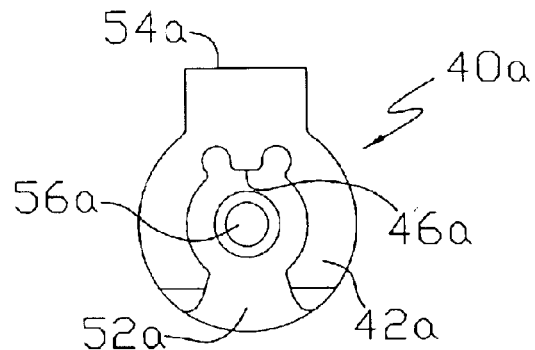
FIG. 3 illustrates a back view of an exemplary combination wheel retainer and axle cover.
Figure 4:
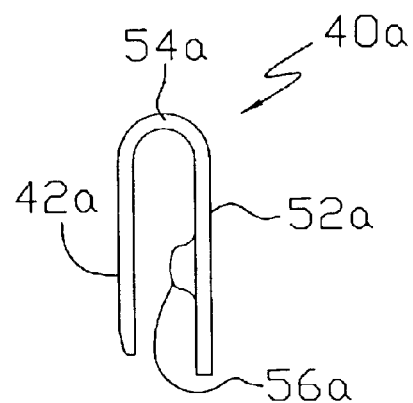
FIG. 4 illustrates a side view of the exemplary combination wheel retainer and axle cover of FIG. 3.
Figure 5:
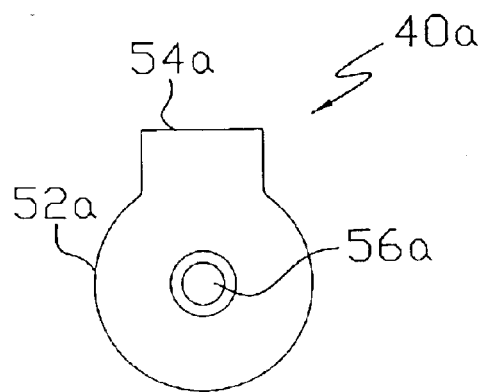
FIG. 5 illustrates a front view of the exemplary combination wheel retainer and axle cover of FIG. 3.
Figure 6:
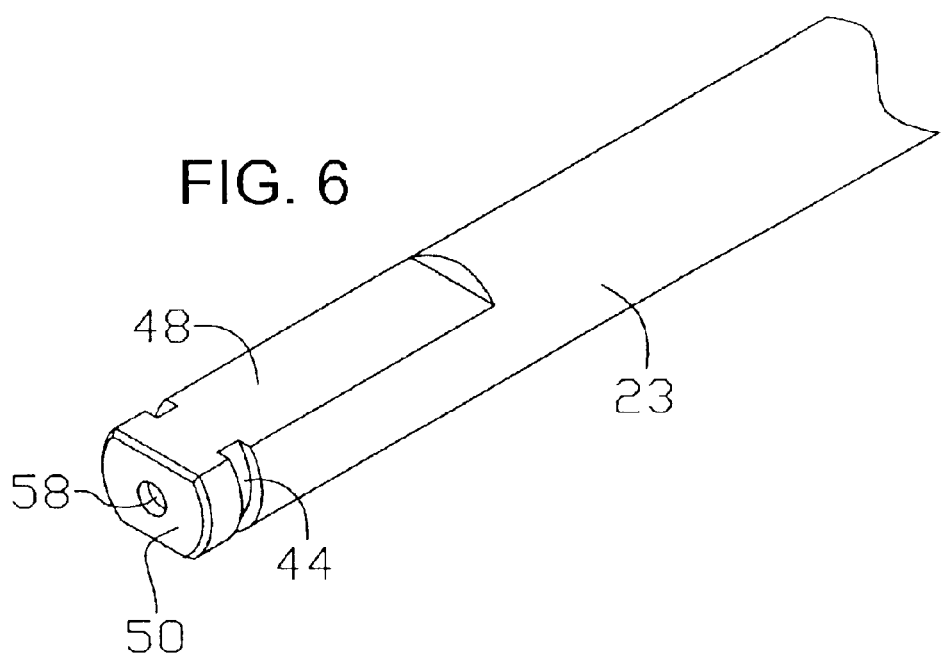
FIG. 6 illustrates a perspective view of an exemplary axle shaft for use in connection with the combination wheel retainer and axle cover of FIG. 3.
Figure 7:
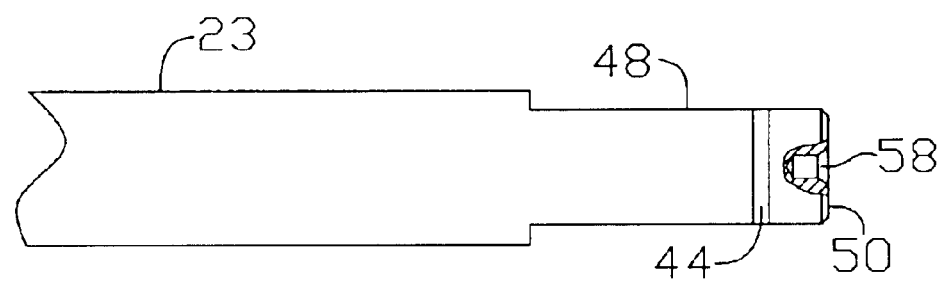
FIG. 7 illustrates a side view of the exemplary axle shaft of FIG. 6 having a portion removed to better depict a locating hole utilized in connection with the combination wheel retainer and axle shaft cover of FIG. 3.
Figure 8:
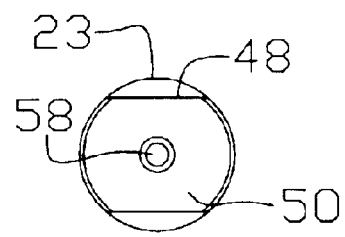
FIG. 8 illustrates an end view of the exemplary axle shaft of FIG. 6.

For use in retaining a wheel mounted to an axle shaft 23, the combination wheel retainer and axle shaft cover 40 is provided for mounting to an end of the axle shaft 23. An exemplary combination wheel retainer and axle shaft cover 40a is illustrated in FIGS. 3–5. In this case, the exemplary combination wheel retainer and axle shaft cover 40a includes a generally ring shaped, retaining portion 42a that is adapted to be positioned around the end of the axle shaft 23, illustrated by way of example in FIGS. 6–10. In this regard, the retaining portion 42a is preferably positioned in a groove 44 formed in the axle shaft 23 so as to prevent axial movement of the combination wheel retainer and axle shaft cover 40a with respect to the axle shaft 23. Preferably, the resilient legs of the retaining portion 42a that engage the sides of the axle shaft 23 have a length and provide a gripping force that is sufficient to inhibit the inadvertent removal of the combination wheel retainer and axle shaft cover 40a from the axle shaft 23. It will also be appreciated that the retaining portion 42a is to be provided with a dimension that serves to prevent the outward axial movement of a wheel hub 49, illustrated in FIG. 9, with respect to the axle shaft 23.

For use in inhibiting rotation of the combination wheel retainer and axle shaft cover 40a with respect to the axle shaft 23, the combination wheel retainer and axle shaft cover 40a is provided with a flat portion that is adapted to mate with a flat surface 48 formed on the end of the axle shaft 23. In the illustrated example, the flat portion is provided as a flat surface 46a that is located within the interior of the retaining portion 42a. This is not, however, intended to be limiting and other surfaces having a flat portion may also be provided to the combination wheel retainer and axle shaft cover 40a for this same purpose. It is also to be understood that the flat surface 48 can be provided to one or more sides of the axle shaft 23.

Figure 9:
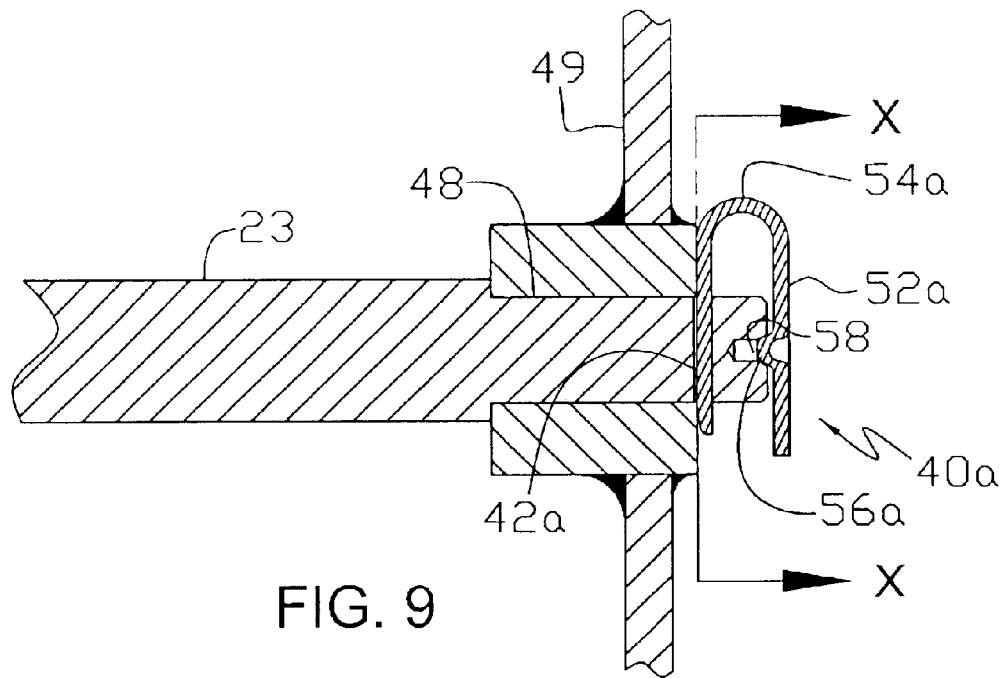
FIG. 9 illustrates a cross-sectional view of the exemplary axle shaft of FIG. 6 on which is mounted the combination wheel retainer and axle shaft cover of FIG. 3 as well as a portion of a wheel hub.
Figure 10:
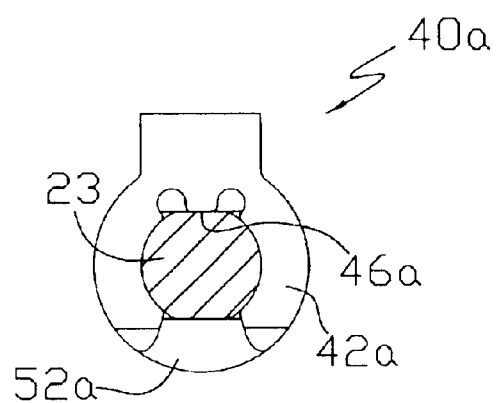
FIG. 10 illustrates a cross-sectional view along line X—X of FIG. 9.

For covering the end surface 50 of the axle shaft 23 as illustrated in FIG. 9, the combination wheel retainer and axle shaft cover 40a includes a cover portion 52a that is adapted to substantially overlay the end surface 50 when the combination wheel retainer and axle shaft cover 40a is mounted to the axle shaft 23. The cover portion 52a is joined to the retainer portion 42a by means of a joining portion 54a. Preferably, the minimum bend radius for the material used to construct the combination wheel retainer and axle shaft cover 40a is utilized for this joining portion 54a. Furthermore, the cover portion 52a may be formed with an optional nipple 56a that is adapted to be positioned within a corresponding opening 58 formed in the end surface 50 of the axle shaft 23. The nipple 56a and the opening 58 cooperate to generally aid in locating the cover portion 52a in a position that overlays the end surface 50 of the axle shaft 23. As will be understood, the opening 58 may be formed as part of the manufacturing process of the axle shaft 23, such as occurs when centers are machined so that the shaft may be machined or ground on center, or may be an opening that is machined specifically to allow for cooperation with the cover portion 52a. The nipple 56a can be formed by punching an indentation into the cover portion 52a, by adding material to the cover portion 52a, or the like.

Figure 11:
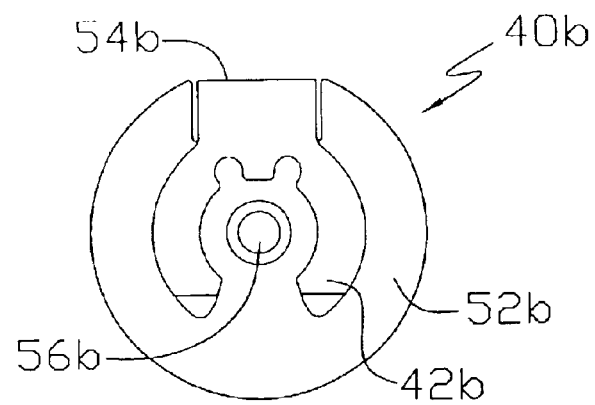
FIG. 11 illustrates a back view of a further, exemplary combination wheel retainer and axle shaft cover.
Figure 12:
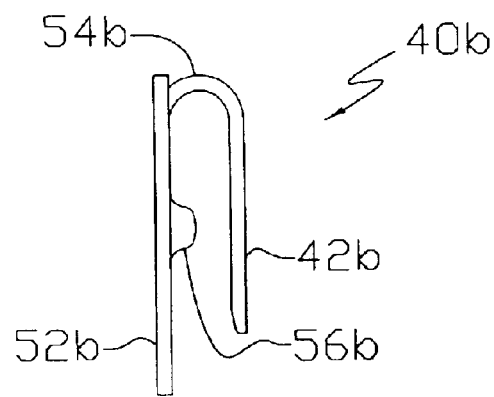
FIG. 12 illustrates a side view of the exemplary combination wheel retainer and axle shaft cover of FIG. 11.
Figure 13:
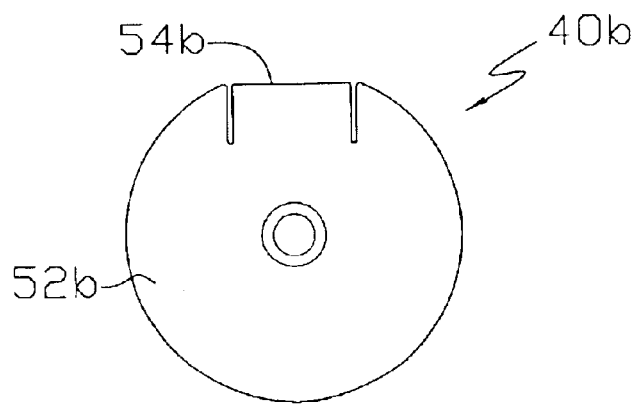
FIG. 13 illustrates a front view of the exemplary combination wheel retainer and axle shaft cover of FIG. 11.

To provide for an improved visual appearance of the joining portion 54, a further combination wheel retainer and axle shaft cover 40b, illustrated in FIGS. 11–13, may be utilized. To this end, the cover portion 52b of the combination wheel retainer and axle shaft cover 40b may be provided with a relatively larger surface area, e.g., having an extended diameter when compared to the embodiment illustrated in FIG. 5. By way of example, the diameter of the cover portion 52b may be approximately the same as the height of the joining portion 54b. In such a case, the similarity in the outer dimension decreases the visual distraction presented by having joining portion 54b extend well beyond cover portion 52b.

Figure 14:
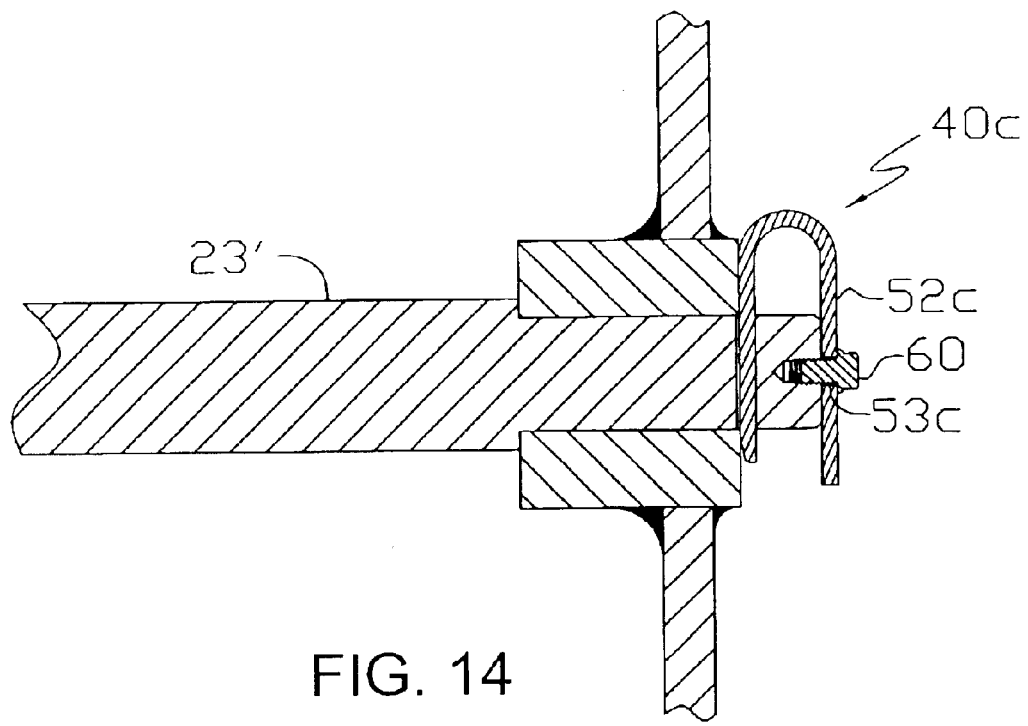
FIG. 14 illustrates a cross-sectional view of yet another exemplary combination wheel retainer and axle shaft cover mounted on an exemplary axle shaft as well as a portion of a wheel hub.
Figure 15:
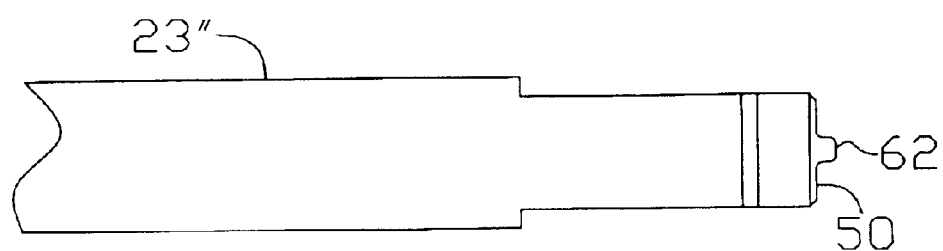
FIG. 15 illustrates a side view of an further exemplary axle shaft for use in connection with the wheel retainer and axle shaft cover of FIG. 14.

As an alternative means for providing cooperative engagement between the cover portion 52 and the end surface 50 of an axle shaft 23', a combination wheel retainer and axle shaft cover 40c, illustrated in FIG. 14, may include an opening 53c that is formed in the cover portion 52c. The opening 53c is used to accept a bolt 60, or the like, that is, in turn, mated with axle shaft 23'. Still further, as shown in FIG. 15, the opening 53c may be used to accept a nipple 62 formed on the end surface 50 of an axle shaft 23" which nipple 62 and opening 53c cooperate to locate the cover portion 52c relative to the end surface 50 of the axle shaft 23". While opening 53c is shown formed through cover portion 52c, it will be appreciated that opening 53c may also be formed as an indentation in cover portion 52c.

Figure 16:
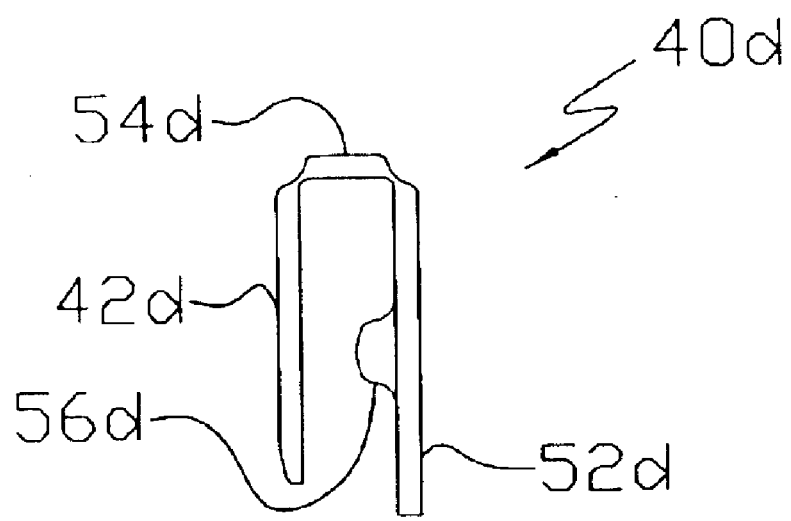
FIG. 16 illustrates a side view of a still further exemplary combination wheel retainer and axle shaft cover.
Figure 17:
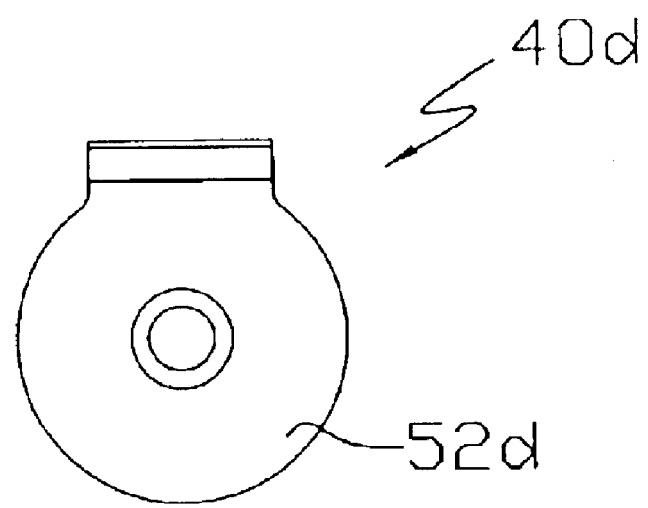
FIG. 17 illustrates a front view of the combination wheel retainer and axle shaft cover of FIG. 16.

A still further combination wheel retainer and axle shaft cover 40d is illustrated in FIGS. 16–17. As illustrated, radii are formed into the bend points between the joining portion 54d and the cover portion 52d and retainer portion 42d so as to allow the cover portion 54d and the retainer portion 42d to be bent more sharply during the process of forming the combination wheel retainer and axle shaft cover 40d. The sharp bend, in turn, allows the joining portion 54d to have a relatively smaller overall height. It will also be appreciated that one well placed radius may be used as a substitute for the illustrated radii to this same end.

Figure 18:
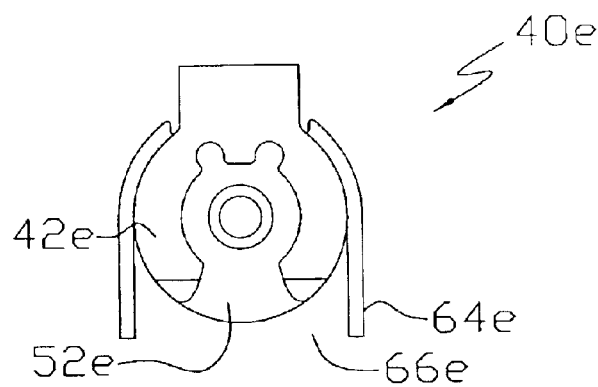
FIG. 18 illustrates a back view of a still further exemplary combination wheel retainer and axle shaft cover.
Figure 19:
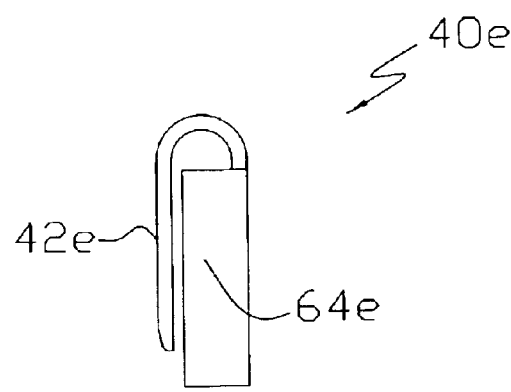
FIG. 19 illustrates a side view of the exemplary combination wheel retainer and axle shaft cover of FIG. 18.
Figure 20:
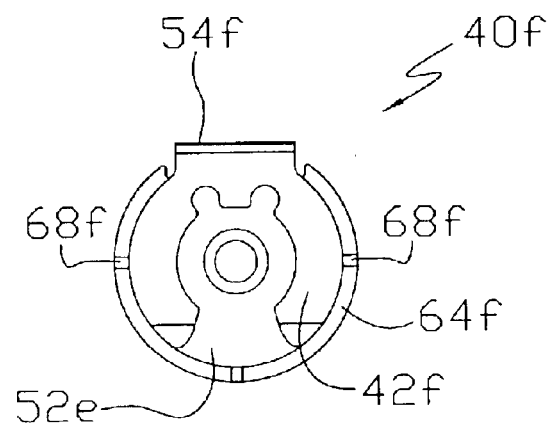
FIG. 20 illustrates a back view of yet another exemplary combination wheel retainer and axle shaft cover.

Yet another combination wheel retainer and axle shaft cover is illustrated by way of example in FIGS. 18 and 19. In this configuration, the cover 52e includes a skirt 64e that extends from the sides of cover 52e toward the retainer 42e. An opening 66e allows the combination wheel retainer and axle shaft cover 40e to be placed over the axle shaft. The skirts may then further reduce the amount of axle shaft 23 exposed to view by an observer. Another variation of such a wheel retainer and axle shaft cover is shown in FIGS. 20 and 21, where the skirt 64f is formed around much of the periphery of cover 52e.

Figure 21:
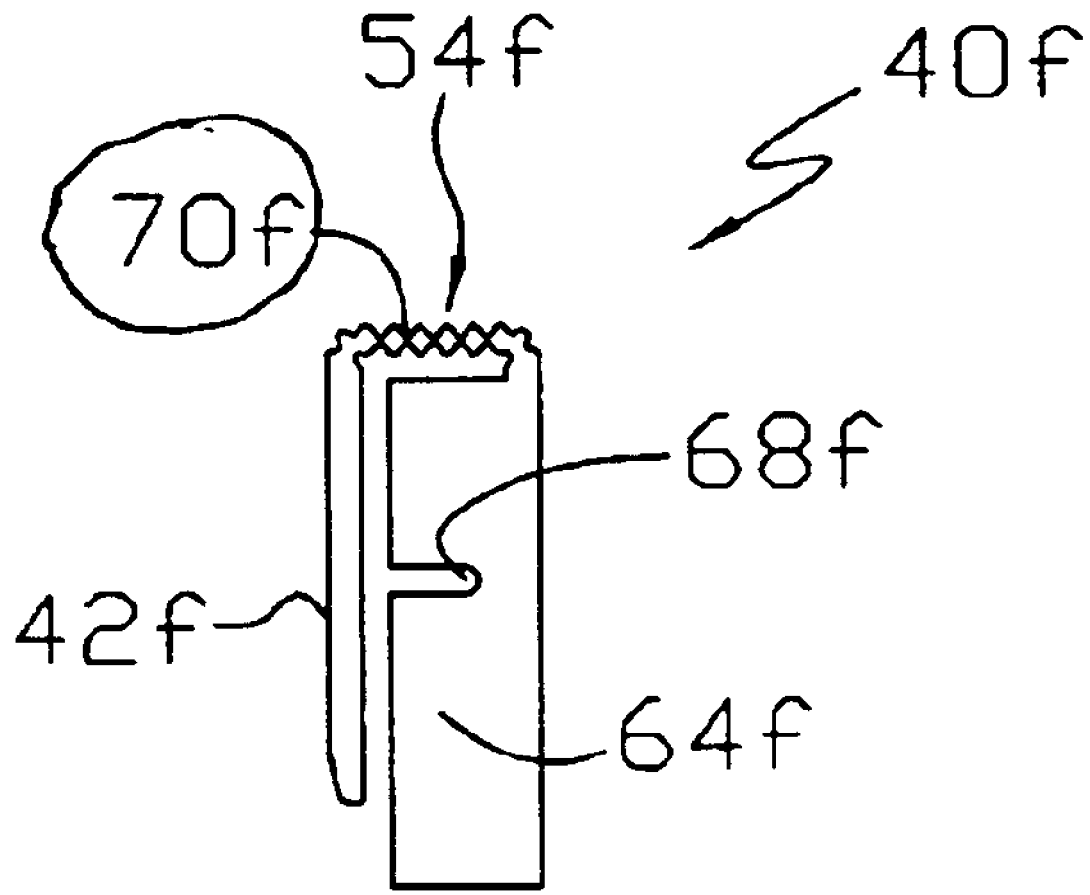
FIG. 21 illustrates a side view of the exemplary combination wheel retainer and axle shaft cover of FIG. 20.

To provide some measure of flexibility between the cover 52e and the retainer 42f in the case where the combination wheel retainer and axle shaft cover 40 is heat treated, the combination wheel retainer and axle shaft cover 40 may be provided with one or more thinned places 68f in the joining portion 54f, as shown by way of example in FIG. 21. It will be appreciated, however, that the configuration of the thinned places 68f is unimportant. Rather, what is desired in the configuration of the thinned places 68f is to provide sufficient flexibility to allow the cover 52e to move away from retainer 42f during installation. This allows the wheel retainer and cover to be placed over the axle shaft 23 without breaking the joining portion 54f. Once installed, the cover 52e can be allowed to move back into a position relative to the axle shaft end portion. Reliefs 70f may also be formed into skirt 64f to aid in the process of forming the skirt 64f, which will minimize wrinkling of the skirt 64f during the bending operation.

All of the aforementioned embodiments are expected to have a type of corrosion protection in order to maintain the pleasing visual appearance of the combination wheel retainer and axle shaft cover 40. Most likely this corrosion protection will be in the form of zinc dichromate. However, other treatments to reduce the tendency of the combination wheel and axle shaft cover 40 are anticipated. Note that a desired aspect of this treatment would leave any heat treatment applied to the combination wheel and axle shaft cover 40 generally unaffected.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalents thereof.

What is claimed is:

1. A hydraulic transmission, comprising:
   a hydraulic motor;
   an axle shaft driven by the hydraulic motor, the axle shaft having a first flat surface;
   a wheel hub mounted to the axle shaft; and
   a combination wheel retainer and axle shaft cover, comprising:
      a retaining ring portion sized and arranged to mate with the axle shaft so as to prevent outward axial movement of the wheel hub relative to the axle shaft, wherein the retaining ring portion has a second flat surface for engaging the first flat surface;
      a cover portion sized and arranged to generally overlay an end of the axle shaft; and
      a joining portion for connecting the retaining ring portion to the cover portion.

2. The hydraulic transmission as recited in claim 1, wherein the cover portion has a nipple for engaging an opening formed in the end of the axle shaft.

3. The hydraulic transmission as recited in claim 1, wherein the cover portion has a size that generally extends the cover portion to a height level with an uppermost point of the joining portion.

4. The hydraulic transmission as recited in claim 1, wherein the cover portion has an opening for engaging a nipple formed on the end of the axle shaft.

5. The hydraulic transmission as recited in claim 1, wherein the cover portion has an opening for accepting a fastener that is, in turn, mated with the end of the axle shaft.

6. The hydraulic transmission as recited in claim 1, wherein one or more radii are formed into one or more respective bend points between the joining portion and the cover portion.

7. The hydraulic transmission as recited in claim 1, further comprising a corrosion-resistant coating applied to the retaining ring portion, cover portion, and joining portion.

8. The hydraulic transmission as recited in claim 7, wherein the corrosion-resistant coating comprises a zinc dichromate.

9. The hydraulic transmission as recited in claim 1, further comprising a hydraulic pump for driving the hydraulic motor.

10. The hydraulic transmission as recited in claim 9, further comprising a single housing in which the hydraulic pump and the hydraulic motor are carried.

11. The hydraulic transmission as recited in claim 10, wherein the housing further carries the axle shaft.

12. A hydraulic transmission, comprising:
    a hydraulic motor;
    an axle shaft driven by the hydraulic motor;
    a wheel hub mounted to the axle shaft; and
    a combination wheel retainer and axle shaft cover, comprising:
       a retaining ring portion sized and arranged to mate with the axle shaft so as to prevent outward axial movement of the wheel hub relative to the axle shaft;
       a cover portion sized and arranged to generally overlay an end of the axle shaft;
       a skirt portion extending from the sides of the cover portion in a direction towards the retaining ring portion; and
       a joining portion for connecting the retaining ring portion to the cover portion.

13. The hydraulic transmission as recited in claim 12, wherein the skirt portion has an opening for allowing the wheel retainer and axle shaft cover to be placed into a position with respect to the axle shaft.

14. The hydraulic transmission as recited in claim 12, wherein the cover portion is moveable relative to the retaining ring portion.

15. The hydraulic transmission as recited in claim 14, wherein one or more thinned areas are formed in the joining portion to allow for movement of the cover portion relative to the retaining ring portion.

16. The hydraulic transmission as recited in claim 12, wherein one or more reliefs are formed in the skirt portion.

17. The hydraulic transmission as recited in claim 12, wherein the cover portion has a nipple for engaging an opening formed in the end of the axle shaft.

18. The hydraulic transmission as recited in claim 12, wherein the cover portion has a size that generally extends the cover portion to a height level with an uppermost point of the joining portion.

19. The hydraulic transmission as recited in claim 12, wherein the cover portion has an opening for engaging a nipple formed on the end of the axle shaft.

20. The hydraulic transmission as recited in claim 12, wherein the cover portion has an opening for accepting a fastener that is, in turn, mated with the end of the axle shaft.

21. The hydraulic transmission as recited in claim 12, wherein one or more radii are formed into one or more respective bend points between the joining portion and the cover portion.

22. The hydraulic transmission as recited in claim 12, further comprising a corrosion-resistant coating applied to the retaining ring portion, cover portion, and joining portion.

23. The hydraulic transmission as recited in claim 12, further comprising a hydraulic pump for driving the hydraulic motor and a single housing in which the hydraulic pump, hydraulic motor and axle are carried.

24. A hydraulic transmission, comprising:
    a hydraulic motor;
    an axle shaft driven by the hydraulic motor;
    a wheel hub mounted to the axle shaft; and
    a combination wheel retainer and axle shaft cover, comprising:
       a retaining ring portion sized and arranged to mate with the axle shaft so as to prevent outward axial movement of the wheel hub relative to the axle shaft;

a cover portion sized and arranged to generally overlay an end of the axle shaft; and a joining portion for connecting the retaining ring portion to the cover portion, wherein the joining portion is adapted to engage a flat portion formed on the axle shaft.

25. The hydraulic transmission as recited in claim 24, wherein the cover portion has a nipple for engaging an opening formed in the end of the axle shaft.

26. The hydraulic transmission as recited in claim 24, wherein the cover portion has a size that generally extends the cover portion to a height level with an uppermost point of the joining portion.

27. The hydraulic transmission as recited in claim 24, wherein the cover portion has an opening for engaging a nipple formed on the end of the axle shaft.

28. The hydraulic transmission as recited in claim 24, wherein the cover portion has an opening for accepting a fastener that is, in turn, mated with the end of the axle shaft.

29. The hydraulic transmission as recited in claim 24, wherein one or more radii are formed into one or more respective bend points between the joining portion and the cover portion.

30. The hydraulic transmission as recited in claim 24, further comprising a corrosion-resistant coating applied to the retaining ring portion, cover portion, and joining portion.

31. The hydraulic transmission as recited in claim 24, further comprising a hydraulic pump for driving the hydraulic motor and a single housing in which the hydraulic pump, hydraulic motor and axle are carried.

32. A hydraulic transmission, comprising:

a hydraulic motor;

an axle shaft driven by the hydraulic motor;

a wheel hub mounted to the axle shaft; and a combination wheel retainer and axle shaft cover, comprising:

a retaining ring portion sized and arranged to mate with the axle shaft so as to prevent outward axial movement of the wheel hub relative to the axle shaft, wherein the retaining ring portion comprises a pair of opposed, flexible legs;

a cover portion sized and arranged to generally overlay an end of the axle shaft; and a joining portion for connecting the retaining ring portion to the cover portion.

33. The hydraulic transmission as recited in claim 32, wherein the cover portion has a nipple for engaging an opening formed in the end of the axle shaft.

34. The hydraulic transmission as recited in claim 32, wherein the cover portion has a size that generally extends the cover portion to a height level with an uppermost point of the joining portion.

35. The hydraulic transmission as recited in claim 32, wherein the cover portion has an opening for engaging a nipple formed on the end of the axle shaft.

36. The hydraulic transmission as recited in claim 32, wherein the cover portion has an opening for accepting a fastener that is, in turn, mated with the end of the axle shaft.

37. The hydraulic transmission as recited in claim 32, wherein one or more radii are formed into one or more respective bend points between the joining portion and the cover portion.

38. The hydraulic transmission as recited in claim 32, further comprising a corrosion-resistant coating applied to the retaining ring portion, cover portion, and joining portion.

39. The hydraulic transmission as recited in claim 32, further comprising a hydraulic pump for driving the hydraulic motor and a single housing in which the hydraulic pump, hydraulic motor and axle are carried.

\* \* \* \* \*